(12) United States Patent
Unruh et al.

(10) Patent No.: US 7,119,909 B2
(45) Date of Patent: Oct. 10, 2006

(54) FILM THICKNESS AND BOUNDARY CHARACTERIZATION BY INTERFEROMETRIC PROFILOMETRY

(75) Inventors: Paul R. Unruh, Oro Valley, AZ (US); Joanna Schmit, Tucson, AZ (US); Erik L. Novak, Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 248 days.

(21) Appl. No.: 10/869,138

(22) Filed: Jun. 16, 2004

(65) Prior Publication Data

US 2005/0280829 A1 Dec. 22, 2005

(51) Int. Cl.
*G01B 9/02* (2006.01)
*G01B 11/28* (2006.01)

(52) U.S. Cl. .................... 356/504; 356/630
(58) Field of Classification Search ............ 356/503, 356/504, 497, 511–515, 630–632, 489, 495
See application file for complete search history.

(56) References Cited

U.S. PATENT DOCUMENTS

2004/0189999 A1* 9/2004 De Groot et al. ............ 356/497
2005/0259265 A1* 11/2005 De Lega .................... 356/497

* cited by examiner

*Primary Examiner*—Hoa Q. Pham
*Assistant Examiner*—Patrick Connolly
(74) *Attorney, Agent, or Firm*—Antonio R. Durand (57) ABSTRACT

Two threshold parameters are used to identify the intensity modulation peaks corresponding to the interfaces of the two sides of a thin film with the adjacent media. The first parameter is used to distinguish modulation data from noise and is set on the basis of actual background noise data measured during the interferometric scan. The second parameter is used to separate actual contrast data from signals of relatively high modulation that satisfy the first parameter but do not in fact result from interference fringes. Data that satisfy both parameters are considered valid modulation data and the peak of each modulation envelope is then calculated using conventional means. The thickness of the film at each pixel is obtained by dividing the scanning distance corresponding to the two peaks by the group index of refraction of the film material.

29 Claims, 10 Drawing Sheets

FILM THICKNESS AND BOUNDARY CHARACTERIZATION BY INTERFEROMETRIC PROFILOMETRY

BACKGROUND OF THE INVENTION

1. Field of the Invention

This invention relates to the general field of film characterization and, in particular, to a technique for improving the process of identifying the boundary and thickness of a thin film by interferometric profilometry.

2. Description of the Prior Art

It is well known that light is reflected at the interface between two media with different indices of refraction. By interfering the light reflected from the interface of the two media with a reference beam in a scanning interferometer, an interferogram is generated with maximum contrast at a scanning position corresponding to the interface. Thus, the precise location of the interface along the scanning direction may be identified by determining the peak of the modulation envelope of the interferometric output beam generated by the scan. As is well understood in the art, this may be achieved using one of several techniques as may be most appropriate depending on the wavelength of the light, the bandwidth of the light, the data acquisition scheme, and other factors relevant to the particular interferometric system in use.

When a transparent film is present in a structure, its thickness produces two interfaces with respective reflections of an incident beam. If both reflected beams are interfered with a reference beam in a scanning interferometer, the resulting interferogram will contain two peaks of maximum contrast, each corresponding to the location of the interface between the film and the abutting material. Based on the scanning position corresponding to each contrast peak, the relative optical-length distance between interfaces may be calculated in conventional manner. The film thickness is then derived directly by dividing the optical distance by the group index of refraction of the film material.

Based on these well-known principles, it has been a practice to calculate the thickness of a film by acquiring interferometric light-intensity data during a scan to produce an interferogram from which the two peaks corresponding to the film's interfaces are identified. A light of appropriate bandwidth is used to ensure sufficient coherence length to produce interference at the scanning positions corresponding to both sides of the film and to generate identifiably separate modulation envelopes. Accordingly, a light-intensity threshold is typically used to separate intensity data corresponding to interferometric fringes from noise and constant (DC) signal components.

Figure 1:
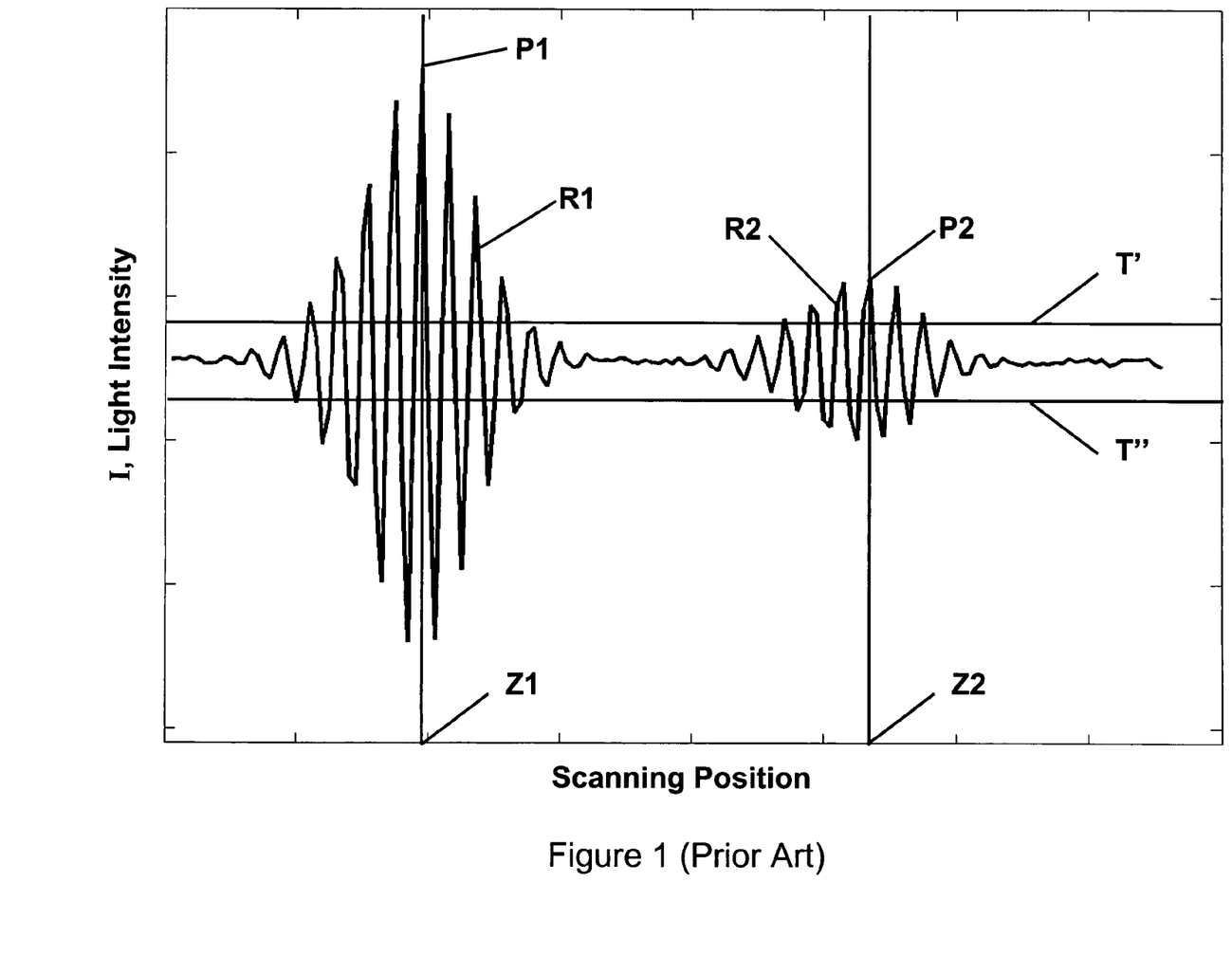
FIG. 1 is a typical pixel correlogram produced by scanning a film with an interferometer, wherein the two regions of high contrast corresponding to the two interfaces of the film with the adjacent media are visibly defined by respective modulation envelopes and peaks.
Figure 2:
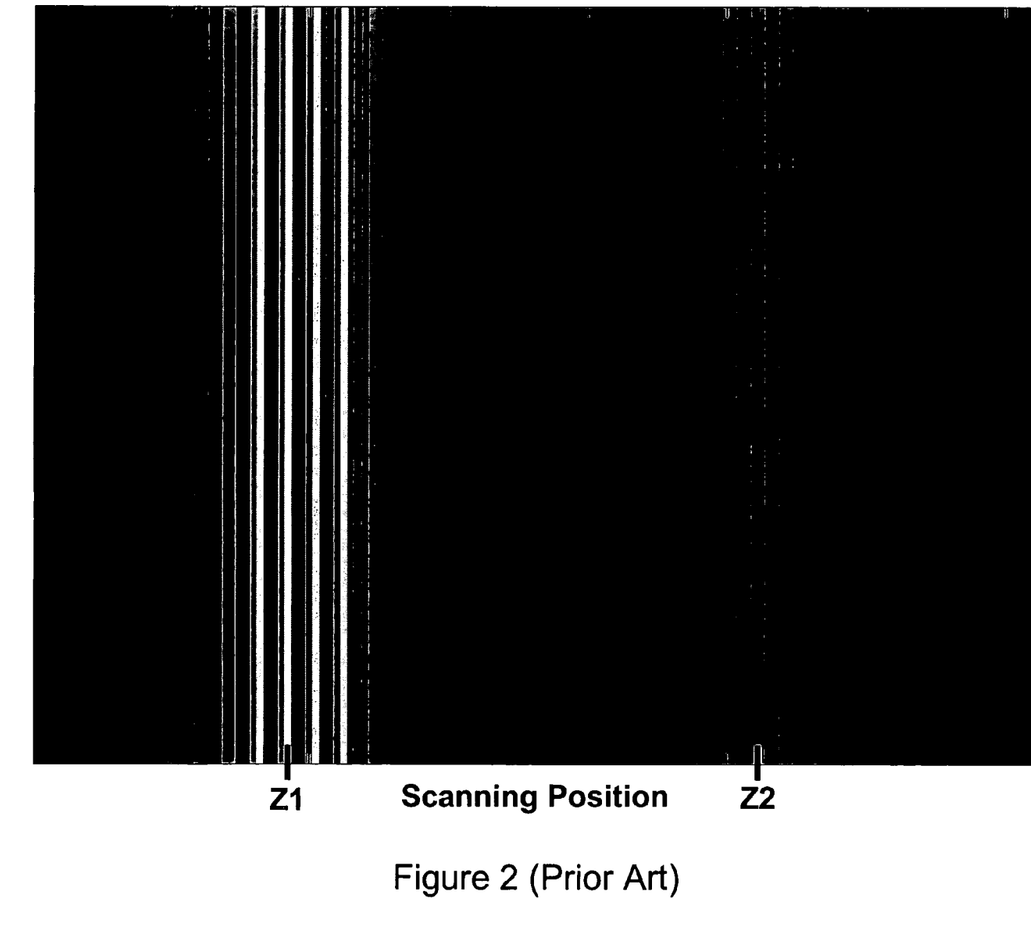
FIG. 2 is an image of the interference fringes corresponding to the correlogram of FIG. 1.

According to the most general prior-art approach, illustrated in FIG. 1, only data above or below (or both) predetermined thresholds T' and T" around the DC component are used to isolate noise and to identify the intensity measurements corresponding to the two regions of significant contrast R1, R2. Modulation envelopes are then derived from these data and used to find the peaks P1,P2 of the regions and the corresponding scanning positions Z1,Z2. Finally, the difference between the peak positions (Z2-Z1) is divided by the group index of refraction to obtain the film thickness at the location corresponding to the pixel associated with the acquired interferogram. FIG. 2 shows interference fringes corresponding to the intensity data of FIG. 1 which illustrate the progressively higher contrast seen in the vicinity of the peaks P1, P2.

Figure 3:
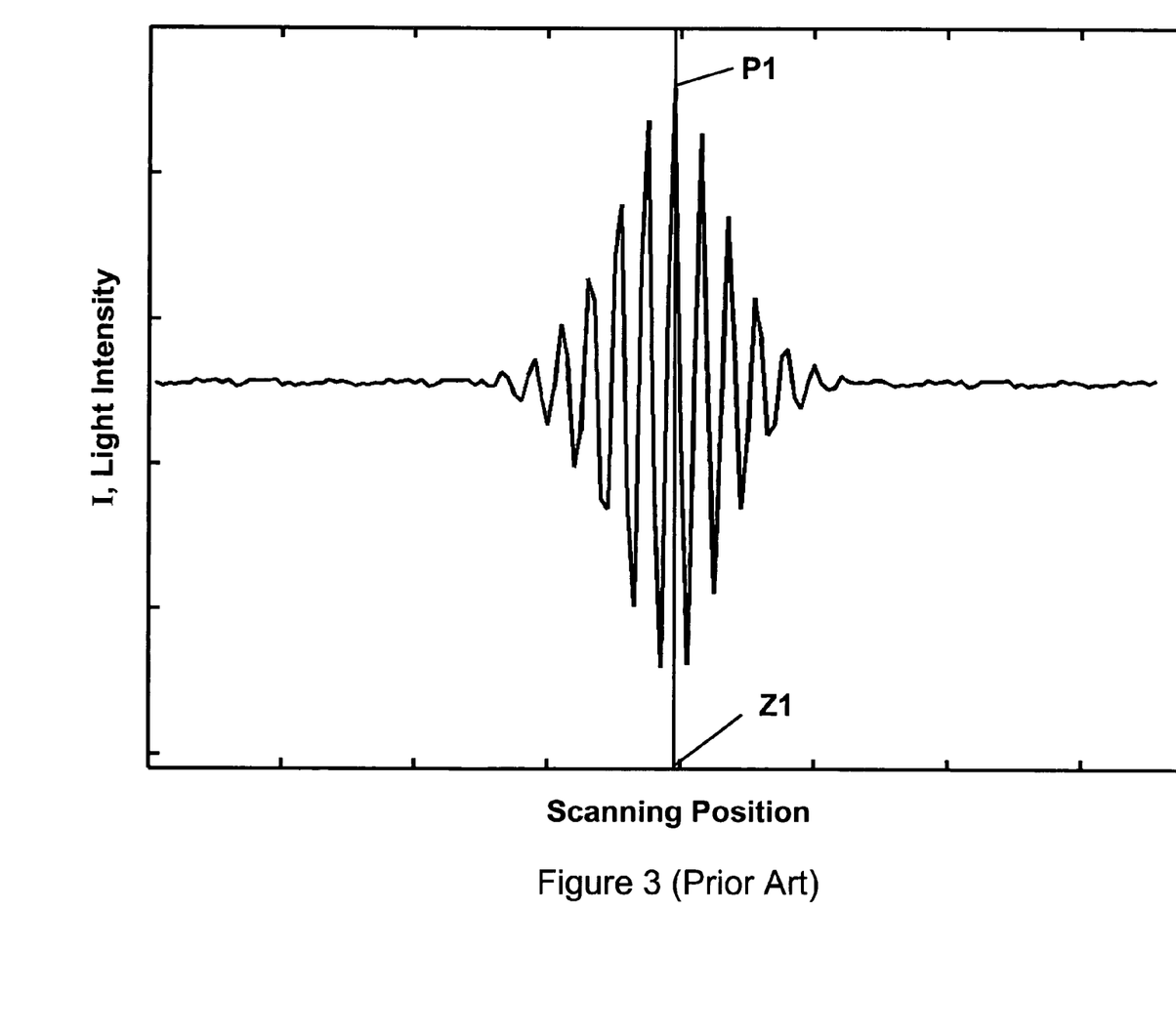
FIG. 3 is a typical correlogram shown to illustrate the precise relationship between the scanning location of its peak and the location of the interface producing the high-contrast region.
Figure 4:
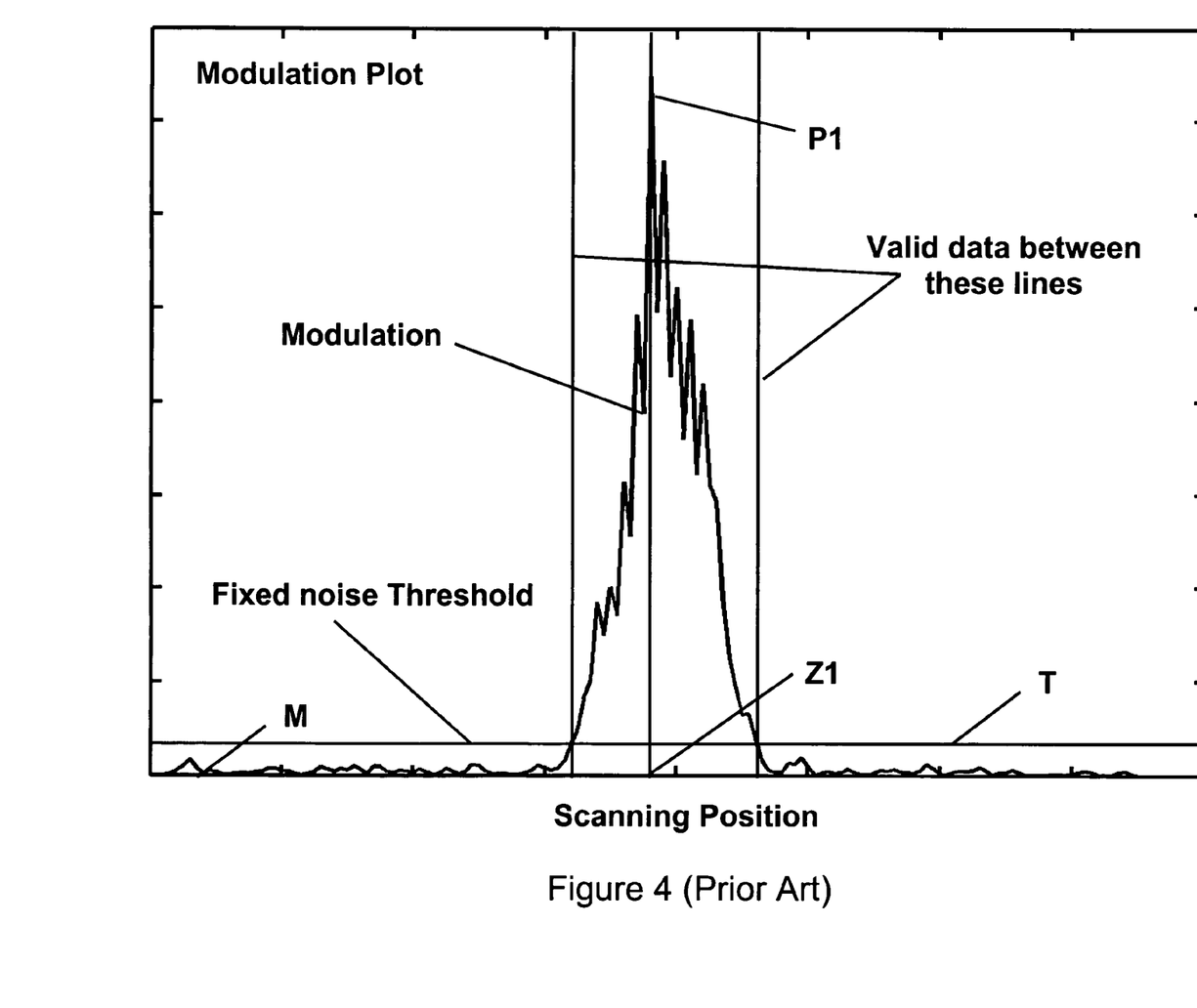
FIG. 4 is a modulation plot corresponding to the correlogram of FIG. 3, wherein modulation is calculated, for example, as the square of the difference in intensity between frames.

In practice, it is more convenient to work with modulation data, rather than intensities. In its simplest form, modulation may be defined as the absolute value of the difference in light intensity recorded between two consecutive data-acquisition frames during a scan (alternatively, the square of the intensity difference is also used). Accordingly, as illustrated in FIGS. 3 and 4 for a single correlogram with peak P1, the modulation M (FIG. 4) of the output of the interferometer (FIG. 3) may be calculated at each scanning step and compared to a first threshold value T to eliminate data that do not reflect the presence of fringes. Since modulation increases materially at scanning positions corresponding to the vicinity of an interface (as seen in FIG. 2), the threshold T is judiciously selected to eliminate data that correspond to noise.

While this approach is theoretically sound and relatively easy to implement, in practice it is often difficult to set the threshold T at the appropriate level. If it is set too high, it becomes difficult to identify peaks characterized by relatively low maximum contrast (such as P2 in FIG. 1). If it is set too low, regions of particularly great noise may be mistakenly identified as regions of contrast and the analysis produces erroneous film-thickness results. This balance is particularly critical when measuring very thin films because the separation between the interfaces of the film sides and the adjacent media may not be sufficient to provide distinct contrast regions. That is, the signals produced by the two interfaces may overlap and yield artifacts that mask the true modulation data produced at each interface. In addition, even when the modulation envelopes are conveniently separated and the threshold parameter is set to clearly distinguish the regions of contrast from noise, different threshold parameters may be needed for materials with different indices of refraction or scattering properties in the film. Therefore, it is typically not possible to utilize this prior-art interferometric approach to characterize multiple film layers.

The present invention is based on the realization that the shortcomings of the prior-art approach may be overcome by relatively simple modifications that produce an optimal threshold level regardless of the film material and system noise. As a result, this disclosure also enables the characterization of single- as well as multi-layer film structures.

BRIEF SUMMARY OF THE INVENTION

In its simplest form, the invention consists of the use of the combination of two threshold parameters to identify the intensity modulation peaks corresponding to the interfaces of the two sides of a thin film with the adjacent media. The first parameter is used to distinguish modulation data from noise and is set on the basis of actual background noise data measured during the interferometric scan. The second parameter is used to separate actual fringe data from signals of relatively high modulation that satisfy the first parameter (and that are therefore believed to be valid data, rather than background noise) but that do not in fact result from interference fringes. Such signals could occur, for example, from small impurities in the film. Only data that satisfy both parameters are considered valid modulation data and the peak of each modulation envelope is then calculated using conventional means, such as an algorithm based on the center of mass approach. The thickness of the film at each pixel is obtained by dividing the scanning distance corresponding to the two peaks by the group index of refraction of the film material.

According to one aspect of the invention, as light-intensity data are collected during the initial steps of the scan (where no interferometric fringes are known to exist), the light-intensity modulation is calculated in conventional manner for a predetermined number of frames. The first threshold parameter is set with reference to a measure of the initial modulation so calculated. For example, the first parameter may be set equal to a multiple of the average of the initial modulation. As the scan progresses, the modulation is calculated at each successive step and compared to the first threshold parameter for validation. All values below the first parameter are discarded as invalid, while all others are assumed to be part of a modulation envelope produced by true contrast signals and are retained for further processing. The separate data belonging to the distinct modulation envelopes pertaining to the opposite sides of the film are identified by grouping valid data from successive acquisition frames until a predetermined minimum number of consecutive invalid data is encountered. When that happens, the group of data relating to the first envelope is considered complete and new valid data subsequently acquired during the scan are assumed to belong to a separate envelope and are again so grouped until a succession of consecutive invalid data equal to the predetermined minimum number is again encountered. Each set of data grouped as belonging to a modulation envelope is then analyzed in conventional manner to find the peak of the envelope and, correspondingly, to calculate the thickness of the film.

According to another aspect of the invention, the modulation data identified in each group are further tested for validity prior to calculating the envelope peaks. Since it is recognized that modulations greater than normally associated with background noise could be detected during a scan even when interferometric contrast is not present, a second threshold parameter is used according to the invention to distinguish these irrelevant data from true interferometric modulation signals. To that end, a second threshold parameter is set with reference to a model modulation envelope derived empirically for the materials and test conditions in use. For example, all modulation values expected to be recorded in the neighborhood of a given interface under normal conditions for the materials and optical conditions in use are cumulated in some fashion (for example, simply by addition) and the resulting quantity is used as the second threshold parameter. Then, the actual valid modulation values in each group acquired during the scan are also cumulated in the same fashion and the resulting quantity is compared to the second threshold parameter for further validation. For instance, if the sum of the measured modulations is at least as large as the sum of the model modulations, the acquired data are accepted as valid and used to calculate the modulation peak corresponding to that group of data. If the sum of the measured modulations is less than the sum of the model modulations, the measured data are taken to be spurious and invalid. Accordingly, they are discarded and the search continues during the scan for a new group of modulations representing a region of interferometric contrast.

According to yet another aspect of the invention, a technique is introduced to separate overlapping modulation peaks, such as occur when the film is very thin and the fringes from the first interface are still visible as the high contrast from the second interface begins to appear and affect the overall modulation. In such cases, one of the two peaks may not be sufficiently well defined to be identified as a separate maximum-contrast locus with respect to the other peak. If the first threshold parameter were set high enough to clearly separate the first modulation envelope from the second one, all information related to the second envelope would be considered invalid and thus lost. If the first threshold parameter were set low enough to validate modulation data from both envelopes, the calculation of the position of each peak would be skewed by the presence of modulation information related to the other peak. Therefore, in one embodiment, the invention assumes a symmetrical shape in the modulation envelope produced by the interferometric measurements in the region of the interface associated with the most visible peak. This assumption enables the construction of a distinct modulation curve for that peak in the region of overlap which, when subtracted from the actual modulation data, produces a modulation curve for the other peak as well. Form this curve the position of the second peak may be derived in conventional manner with substantially greater accuracy than heretofore possible.

Various other purposes and advantages of the invention will become clear from its description in the specification that follows, and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DESCRIPTION OF THE PREFERRED EMBODIMENTS OF THE INVENTION

The invention lies in the improvements provided in the nature and values of the thresholds used to identify valid data from noise and other invalid data in processes of film characterization by interferometric methods. The first improvement consists of generating a first threshold based on actual noise data derived from the scan of the test film, rather than based on empirical historical data. Another improvement lies in the use of a model modulation curve for the film under test, and the use of this model to exclude from consideration data that appear to belong to a region of high contrast but in fact do not. Yet another improvement makes it possible to separate the two regions of high contrast corresponding to the two film interfaces also when the regions overlap, preventing the clear identification of corresponding modulation peaks.

The term "correlogram" is used in this disclosure, as in the art, to refer both to the two-dimensional interferogram corresponding to a pixel and to the three-dimensional set of interferograms corresponding to an area of the detector produced by a multi-frame scan during a conventional interferometric measurement. Accordingly, the correlogram for any given pixel may contain a single or multiple sets of modulation envelopes. "Modulation" is used generically as a term referring to a measure of contrast or fringe visibility (to detect the presence of fringes), as these terms are commonly used in the art of interferometry. The terminology "scan location" is used with reference to the relative position of the moving part during an interferometric scan. "Plan location" is used to refer to the particular portion of the surface of the film sample corresponding to a pixel in the interferometric detector. Typically, a plan location is perpendicular to the direction of scanning.

Figure 5:
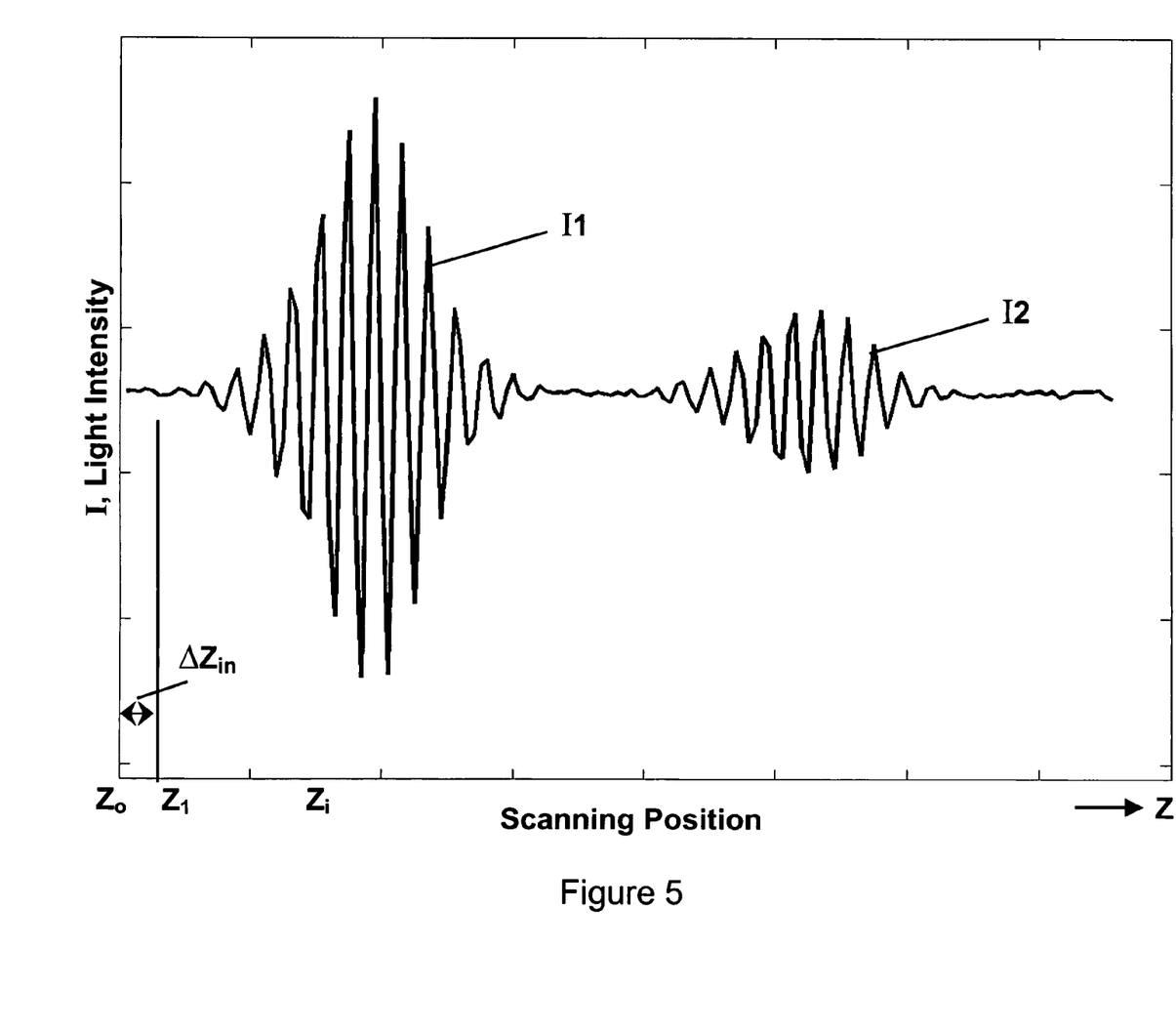
FIG. 5 is a correlogram showing an initial region of no contrast produced by the film under test followed by two distinct regions of high contrast produced by the film's interfaces with adjacent media.
Figure 6:
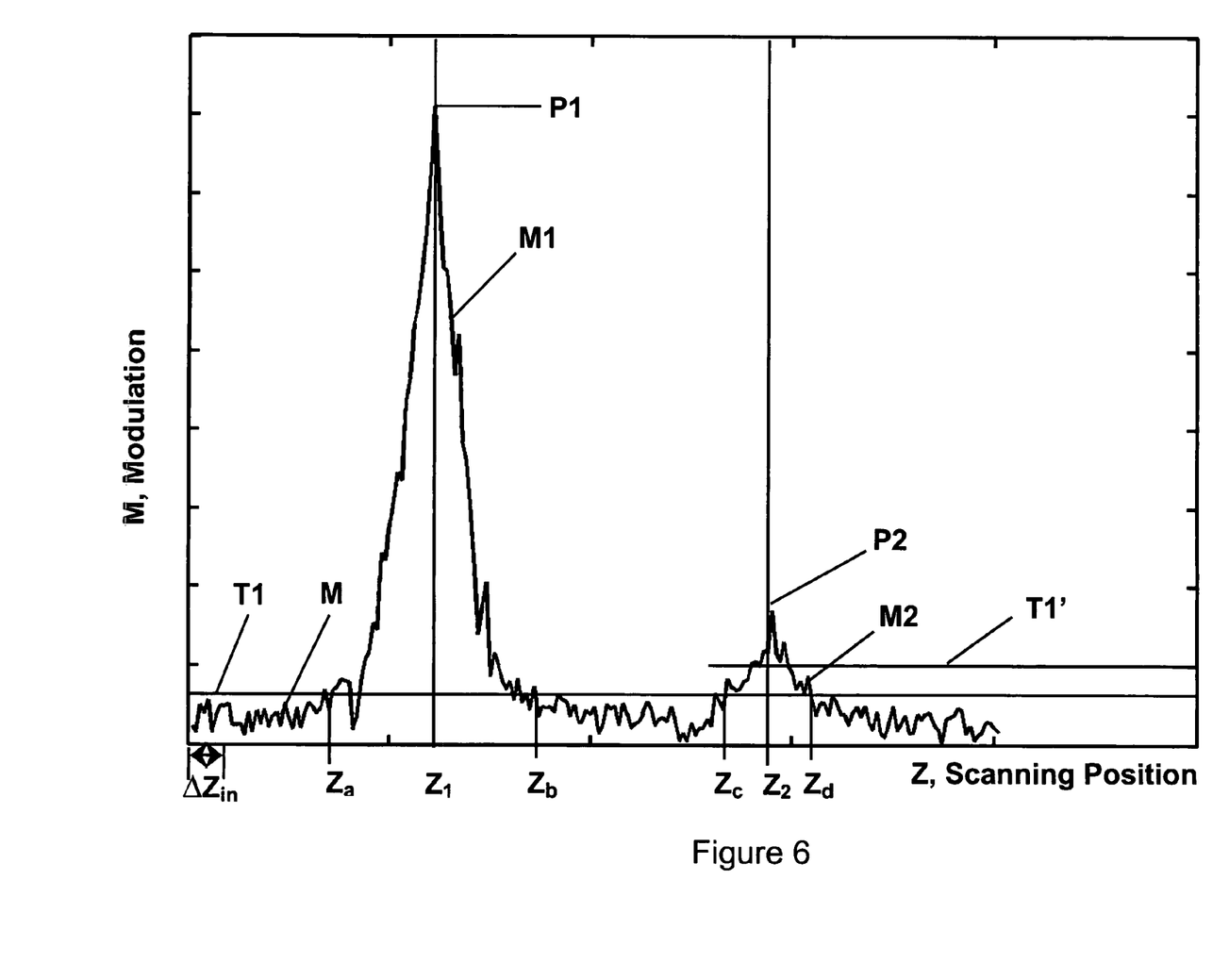
FIG. 6 is a modulation plot corresponding to the correlogram of FIG. 5, wherein modulation is again calculated as the square of the difference of the intensities recorded between frames.

Referring to FIG. 5 of the drawings, a typical correlogram is reproduced as is generated by an interferometric scan of a film having two interfaces with adjoining media. It is well understood that a similar interferogram is produced by the scan with reference to each detector pixel corresponding to the film. Intensity data are collected at each acquisition frame $Z_i$ as the interferometric scan proceeds from an initial scanning position $Z_0$ and the modulation between steps is calculated according to some acceptable measure, such as the absolute value or the square of the difference in intensity of adjacent frames recorded by the detector. FIG. 6 is the plot modulation M so calculated corresponding to the correlogram of FIG. 5. According to one aspect of the present invention, the scan is initiated at a position sufficiently removed from a region of high contrast to ensure that the initial interferogram readings only record noise and artifacts, as illustrated in the figure. After a predetermined number of modulation values has been collected during the initial part of the scan $\Delta Z_{in}$ to establish the level of noise present in the system, a first threshold T1 is calculated on the basis of these actual noise values. For example, T1 may be set equal to a factor times the average modulation recorded in the interval $\Delta Z_{in}$. In practice, we found that T1=3 Min, where Min is the average modulation calculated for the initial interval $\Delta Z_{in}$, is a very good initial threshold level to separate noise from valid data.

Accordingly, the first threshold T1 is used (either on the fly, as the scan proceeds, or during processing after completion of the scan) to separate modulation values corresponding to regions of high contrast from noise. As modulation values greater than T1 are recorded, the first region of high contrast (or modulation envelope) M1 is identified and the corresponding modulation data are used to calculate the location Z1 of its peak P1 by conventional methods. For example, the well-known center-of-mass method is very suitable to practice the invention. Progressing along the scan, the same first threshold T1 is used to establish the end of the modulation envelope M1 by identifying the scanning frame where the modulation begins again to be lower than T1. In practice, that point is better established by identifying the first series of invalid modulation values, such as 10, for example. In FIG. 6, M1 is defined by the envelope of modulations recorded between Za and Zb.

The second region of high contrast is similarly identified by monitoring the modulation recorded at each scan frame and identifying a new set of modulation values that exceeds the threshold. According to the invention, when the film is thick enough, it is preferred to calculate a new threshold T1' by repeating after the end of the first envelope M1 the same procedure followed to establish T1. That is, a predetermined sequence of modulation below T1 is again averaged and used to calculate the new value T1' for the first threshold. If the noise and other signals are higher (or lower) than before, T1' will advantageously reflect that change, as illustrated in FIG. 6, and facilitate the process of distinguishing a new region of high contrast from the relevant noise signal. Using such new threshold value, a new modulation envelope M2 is identified and used to calculate the scan location Z2 corresponding to its peak P2. Once these scanning positions are known, the corresponding film thickness is calculated by conventional means, such as by dividing the difference in scan positions (which corresponds to the optical thickness of the film) by the film's group index of refraction.

Figure 7:
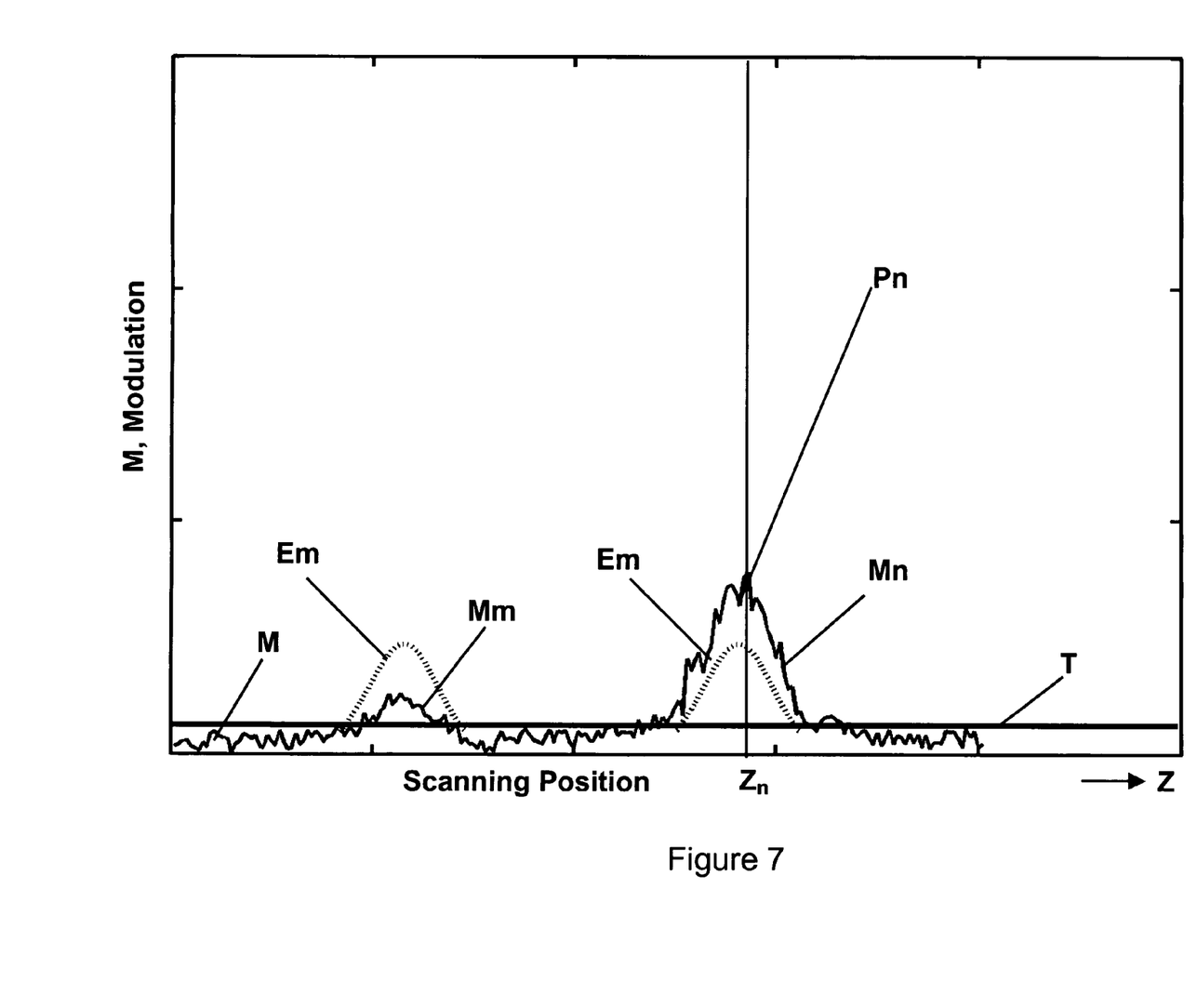
FIG. 7 is a modulation plot showing the use of a model envelope as the basis for a second threshold utilized to further separate valid contrast data from noise and other artifacts.

While the approach described above represents an improvement over the art, it is still inadequate in situations where the presumed modulation envelope is not very distinct from the first threshold, as illustrated in FIG. 7. In such cases, it is useful to use some additional information to further discriminate between valid and invalid data points. Thus, according to another aspect of the invention, each modulation envelope Mm potentially corresponding to a region of high contrast is compared to a second threshold T2 for further discrimination. T2 is selected on the basis of a priori knowledge about the shape of the modulation envelope Em expected from the interface between the film and the adjacent interfacing medium. For example, the sum of the model modulations (as defined at each acquisition frame by the envelope Em) could be taken as the second threshold T2 and compared to the corresponding sum Sm of the computed modulations within the region Mm. If the sum of modulations Si is within a predetermined parameter based on T2 (for example, $Sm \geq fT2$, where $f \geq 1$), the Mm data are considered to be valid and a corresponding peak is calculated, as illustrated above. If not, the Mm modulation data are discarded as invalid and the search for a region of high contrast continues along the scan.

Still referring to FIG. 7, a second high-contrast region with modulation envelope Mn is shown to illustrate the concept. In this case, it is clear that the modulation data correspond to a true region of high contrast because their envelope Mn is even greater than the model modulation response expected from the sample film under test. Accordingly, the sum Sn of the modulation values corresponding to the envelope Mn would be likely to pass the second threshold test (i.e., $Sn \geq fT2$) and the data would be considered valid a belonging to a region of high contrast. Therefore, in the example of FIG. 7, having first discarded the data associated with Mm, the scan location Zn of the peak Pn of the envelope Mn could be calculated in conventional manner providing information about the position of the first interface found during the scan. The second interface would be located in similar manner with the remaining modulation data using T and Em as two levels of threshold to separate valid data from noise. Once a second peak is identified, the film thickness is calculated on the basis of the scanning distance between peaks as indicated above.

Figure 8:
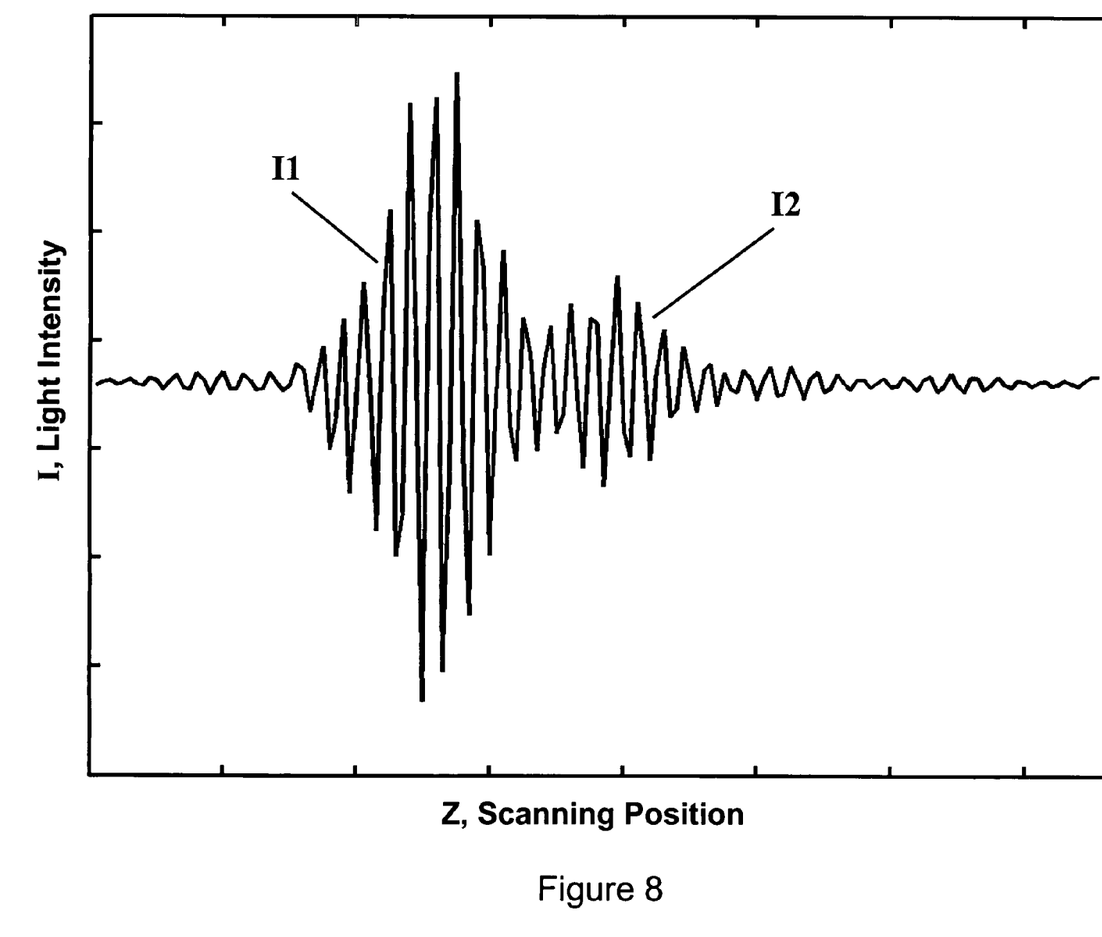
FIG. 8 is a correlogram showing overlapping regions of high contrast.
Figure 9:
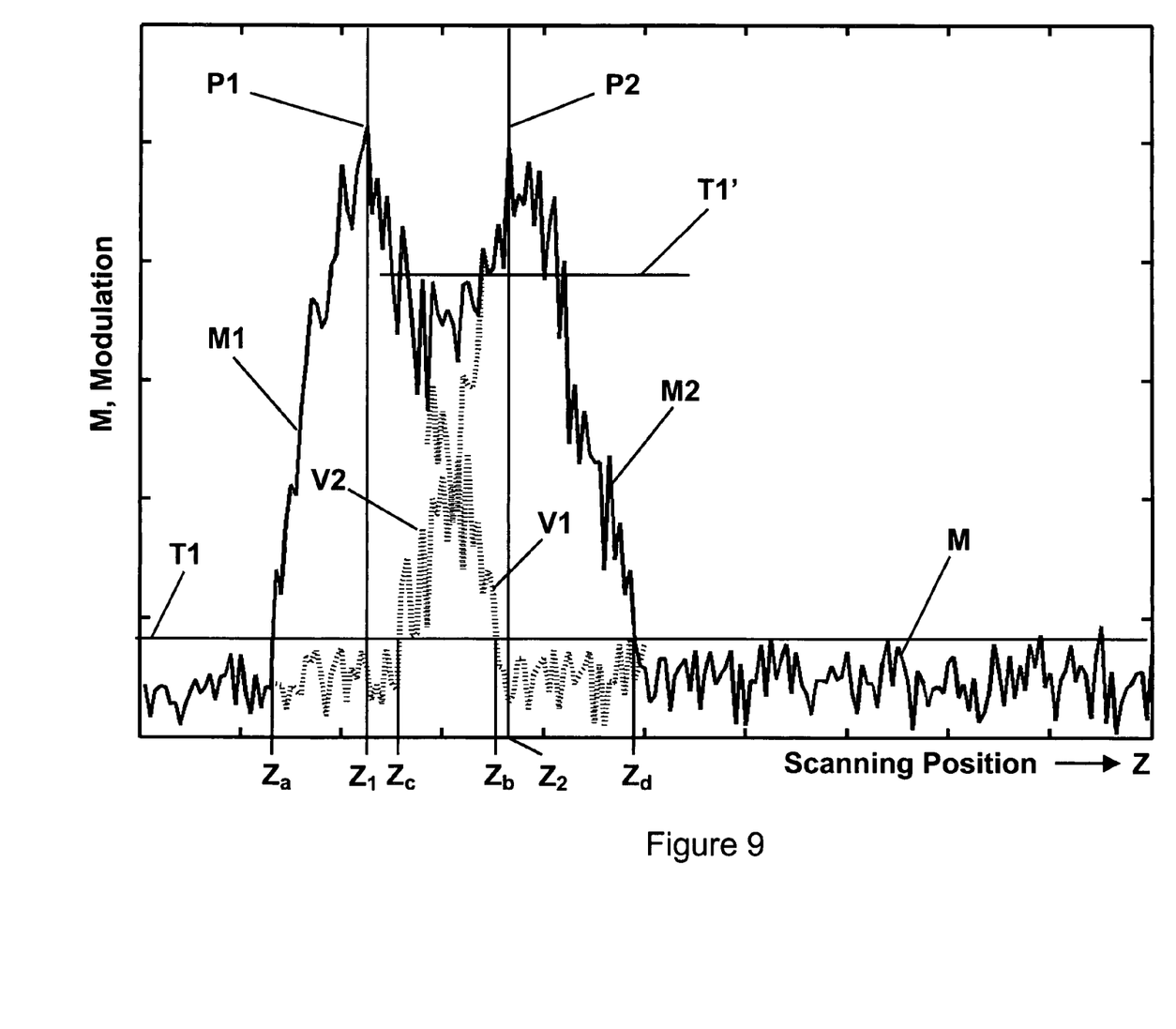
FIG. 9 is a modulation plot corresponding to the correlogram of FIG. 8 and illustrating the use of a virtual modulation envelope to discriminate between overlapping regions of high contrast.

According to another aspect of the invention, an approach is provided to enable the identification of the peaks associated with the film interfaces also when the interferometric correlogram does not afford a clear separation because of overlap between modulation envelopes. As illustrated in the correlogram of FIG. 8 and the related modulation envelope of FIG. 9, when two regions of high contrast overlap, it is likely that one of the peaks is readily discernable while the other is not. In the figures, the first high-contrast region 11 encountered during the scan is apparent from the initial group of data that shows increasingly brighter fringes and modulations greater than the first threshold T1 on the ascending portions of the intensity and modulation plots, but the descending portions are not clearly indicative of the presence of another contrast region (I2). Even a well placed second threshold T1' would not make it possible to clearly distinguish the fringe contribution of the first interface from that of the second interface of the film with the adjacent media. If T1' were set high enough to validate a few data points of the second modulation envelope, as shown in FIG. 9, the information would not be sufficient to perform a good analysis of the peak position because many of the modulation data belonging to this envelope would be invalidated by the threshold T1'. If this threshold were set low enough to validate most of the overlapping data, no clear measure could be obtained about the contribution of each envelope.

Therefore, according to the invention, the outer portion of one of the two overlapping envelopes (preferably the envelope that is more clearly distinguishable by its peak) is used to estimate the complete shape of the corresponding modulation envelope by assuming a particular relationship between the two sides of the envelope. Typically and most easily, the assumption may be made that the modulation envelope is symmetric, but other geometric relations may be used based on empirical knowledge. For example, an assumption of symmetry in FIG. 9 would allow the extrapolation of the envelope M1 along the modulation values represented by the virtual line V1. Based on this assumption, valid modulations would be identified as described above by grouping all values meeting the first threshold criterion (those between Za and Zb in the figure). Then, a second threshold Em could be applied, as disclosed above, to validate the modulations corresponding to the reconstructed envelope M1 and, if the threshold were met, the data would be used to estimate the location Z1 of the envelope's peak P1.

Once the first envelope M1 is reconstructed, the second envelope can be similarly obtained by assuming its symmetry and constructing the missing portion V2 by extrapolation. Alternatively, the portion V2 of the envelope M2 could be calculated by subtracting the virtual modulation value from the actual data. In either case, a second set of validated modulations could be obtained by applying again the first threshold T1, applying the second threshold (Em or another appropriate envelope-model En), if desired, and then calculating a second location Z2 corresponding to the envelope's peak P2 based on the modulation data contained between Zc and Zd (FIG. 9).

Figure 10:
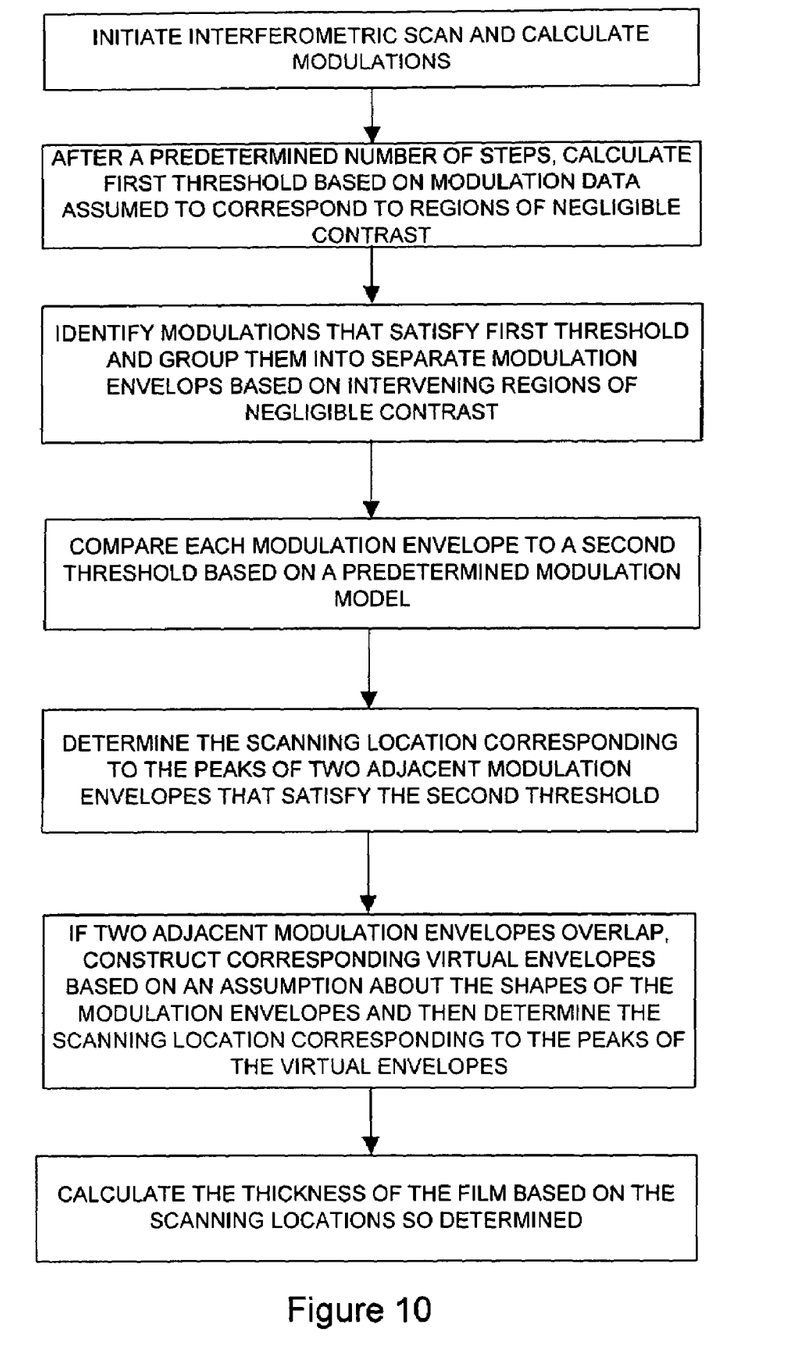
FIG. 10 is a flow chart of the steps involved in practicing the invention.

It is clear from the description that any or all of the threshold tests disclosed herein may be applied to improve the interferometric process of characterizing a film. Those skilled in the art would know how to judiciously select tests and threshold levels appropriate for a particular application. It is also clear that the same principles are applicable to multi-layer film samples, the only difference being that the number of interfaces would increase. Also, the measurement of film thickness inherently provides a means for delineating the contour of a film structure as well because the thickness will be reduced to zero at the edges of the film. Therefore, the invention is also useful to improve methods used to characterize film boundary. FIG. 10 illustrates the steps involved in carrying out the basic concepts of the invention.

In order to improve the quality of the fringes observed at each surface interface during a scan, it may be desirable to change the intensity level of the source light, or its wavelength, or bandwidth, or the relative light intensity between the interferometer arms, or the numerical aperture of the objective. That is, any one or more of these parameters may be varied to more suitable values as the scan proceeds from one interference zone to the next one (i.e., between modulation envelopes). If this techniques is followed, it may become necessary to reset the first threshold T1 to a new level T1' to account for the different noise level that the new parameters would introduce. This can be accomplished using the technique described above with reference to FIG. 6.

It is understood that in all cases the information derived through the use of the invention pertaining to all of the surfaces encountered in the scan becomes available for display or presentation in any conventional form as an output of the algorithm. Thus, all surfaces corresponding to an interface and a related set of fringes can be reconstructed from the data so collected. Data from regions that contain only one fringe envelope may be combined with data corresponding to multiple sets of fringes to reconstruct the object being measured. For example, if a film is present only in a small region of the test surface, the data from the top surface of the film can be combined with the data from the region of the surface without film to produce a map of the overall top surface (that is, including the film); or the film-to-surface interface information can be combined with the data from the surface alone to produce a map of the surface, even in the area covered by the film.

As those skilled in the art would readily understand, when a test surface contains narrow furrows that exhibit strong diffraction effects, the interferometric scan of such a surface produces a fringe response similar to the one produced by a thick film. That is, the bottom and the top of each furrow behave as two separate surfaces of a film and produce two separate sets of interferometric fringes. In essence, the refractive effects create a virtual layer between the tops and bottoms of the furrows. Therefore, using normal interferometric procedures, only the top interface of this virtual layer is identified and measured, and the true profile of the test surface is not measured. The present invention can be utilized advantageously to overcome this problem because it enables the measurement of both interfaces of such virtual layer (the bottom one with the test surface and the top one with air). Once both layers are measured, the true profile of the test surface can be easily constructed and displayed according to normal profilometric techniques, as indicated above.

Various changes in the details, steps and components that have been described may be made by those skilled in the art within the principles and scope of the invention herein illustrated and defined in the appended claims. For example, the concepts of the invention may be applied on the fly during the interferometric scan (as described) or after the fact with the same advantages. For example, modulation can be calculated at the end of the scan and of the acquisition of the interferomatric data using any of the methods well known in the art, such as Fourier, Wavelet, or Hilbert transforms. Similarly, modulation could be obtained directly by electronic means, rather than by calculation (such as by well known filtering hardware). All these approaches are equally suitable to practice the present invention.

Therefore, while the invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. An interferometric method for measuring the thickness of a film at a predetermined plan location on the film, the method comprising the following steps:
   scanning the film at said predetermined plan location on the film to produce a correlogram corresponding to interference of a reference beam with a test beam reflected at a first interface between the film and a first adjacent medium and at a second interface between the film and a second adjacent medium;
   calculating a modulation profile from said correlogram;
   identifying, as valid modulation values, modulation values from said profile that are above a first threshold;
   sorting said valid modulation values into a first modulation envelope corresponding to a first region of high contrast produced by the first interface and into a second modulation envelope corresponding to a second region of high contrast produced by the second interface;
   determining a first scanning location corresponding to a peak of the first modulation envelope and a second scanning location corresponding to a peak of the second modulation envelope; and
   calculating a film thickness at said plan location on the basis of said first and second scanning locations;
   wherein said first threshold is calculated by identifying modulation values known to be outside at least one of said regions of high contrast, and by setting the first threshold as a function of the modulation values so identified.

2. The method of claim 1, further comprising the step of updating said first threshold after sorting said valid modulation values into said first modulation envelope corresponding to the first region of high contrast produced by the first interface, said updating step being performed by identifying new modulation values known to be outside another region of high contrast and by resetting the first threshold as a function of the new modulation values so identified.

3. The method of claim 1, wherein said first threshold is equal to a factor times an average of said modulation values so identified.

4. The method of claim 2 wherein said first threshold is equal to a factor times an average of said modulation values so identified.

5. The method of claim 1, further comprising the step of comparing said first and second modulation envelopes to a second threshold prior to the step of determining scanning locations, wherein the second threshold is a function of a model modulation envelope.

6. The method of claim 5, wherein said second parameter is equal to a factor times a sum of all modulation values corresponding to said model modulation envelope.

7. The method of claim 2, further comprising the step of comparing said first and second modulation envelopes to a second threshold prior to the step of determining scanning locations, wherein the second threshold is a function of a model modulation envelope.

8. The method of claim 7, wherein said second parameter is equal to a factor times a sum of all modulation values corresponding to said model modulation envelope.

9. The method of claim 3, further comprising the step of comparing said first and second modulation envelopes to a second threshold prior to the step of determining scanning locations, wherein the second threshold is a function of a model modulation envelope.

10. The method of claim 9, wherein said second parameter is equal to a second factor times a sum of all modulation values corresponding to said model modulation envelope.

11. The method of claim 1, further comprising the steps, when said first and second modulation envelopes overlap, of estimating a virtual envelope for at least one of said envelopes on the basis of an estimated shape in the region of overlap, and of calculating a scanning location corresponding to a peak of the virtual envelope during said determining step.

12. The method of claim 11, wherein said estimated shape assumes that said at least one of the envelopes is symmetrical.

13. The method of claim 1, wherein said reference and test beams are produced by a light source of predetermined intensity, wavelength and waveband; and wherein at least one of said intensity, wavelength and waveband is varied during said scanning step.

14. The method of claim 1, wherein said reference and test beams are produced at a predetermined intensity ratio; and wherein said ratio is varied during said scanning step.

15. The method of claim 1, wherein said scanning step is carried out with an objective having a predetermined numerical aperture; and wherein said aperture is varied during said scanning step.

16. The method of claim 1, wherein said reference and test beams are produced at a predetermined intensity ratio; and wherein said ratio is varied during said scanning step.

17. An interferometric method for measuring the thickness of a film, the method comprising the following steps:
   scanning the film at a predetermined plan location on the film to obtain a correlogram produced by interference of a reference beam with a test beam reflected at a first interface between the film and a first adjacent medium and at a second interface between the film and a second adjacent medium;
   calculating a modulation profile from said correlogram;
   identifying, as valid modulation values, modulation values from said profile that are above a first threshold;
   sorting the valid modulation values into a first modulation envelope corresponding to a first region of high contrast produced by the first interface and into a second modulation envelope corresponding to a second region of high contrast produced by the second interface;
   comparing said first and second modulation envelopes to a second threshold, wherein the second threshold is a function of a model modulation envelope;
   determining a first scanning location corresponding to a peak of the first modulation envelope and a second scanning location corresponding to a peak of the second modulation envelope; and calculating a film thickness at said plan location on the basis of said first and second scanning locations.

18. The method of claim 17, wherein said second parameter is equal to a factor times a sum of all modulation values corresponding to said model modulation envelope.

19. The method of claim 17, further comprising the steps, when said first and second modulation envelopes overlap, of estimating a virtual envelope for at least one of said envelopes on the basis of an estimated shape in the region of overlap, and of calculating a scanning location corresponding to a peak of the virtual envelope during said determining step.

20. The method of claim 19, wherein said estimated shape assumes that said at least one of the envelopes is symmetrical.

21. The method of claim 17, wherein said reference and test beams are produced by a light source of predetermined intensity, wavelength and waveband; and wherein at least one of said intensity, wavelength and waveband is varied during said scanning step.

22. The method of claim 17, wherein said reference and test beams are produced at a predetermined intensity ratio; and wherein said ratio is varied during said scanning step.

23. The method of claim 17, wherein said scanning step is carried out with an objective having a predetermined numerical aperture; and wherein said aperture is varied during said scanning step.

24. The method of claim 17, wherein said reference and test beams are produced at a predetermined intensity ratio; and wherein said ratio is varied during said scanning step.

25. In an interferometric method for measuring the thickness of a film based on scanning locations corresponding to peaks of overlapping modulation envelopes produced by interference of a reference beam with a test beam reflected at a first interface between the film and a first adjacent medium and at a second interface between the film and a second adjacent medium, the improvement comprising the following steps:
   estimating a virtual envelope for at least one of said envelopes on the basis of an estimated shape in a region of overlap; and
   calculating a scanning location corresponding to a peak of the virtual envelope.

26. The method of claim 25, wherein said estimated shape assumes that said at least one of the envelopes is symmetrical.

27. An interferometric device for measuring the thickness of a film, comprising:
   means for scanning the film at a predetermined plan location on the film to obtain a correlogram produced by interference of a reference beam with a test beam reflected at a first interface between the film and a first adjacent medium and at a second interface between the film and a second adjacent medium;
   means for calculating a modulation profile from said correlogram;
   means for identifying, as valid modulation values, modulation values from said profile that are above a first threshold;
   means for sorting the valid modulation values into a first modulation envelope corresponding to a first region of high contrast produced by the first interface and into a second modulation envelope corresponding to a second region of high contrast produced by the second interface;
   means for determining a first scanning location corresponding to a peak of the first modulation envelope and a second scanning location corresponding to a peak of the second modulation envelope;
   means for calculating a film thickness at said plan location on the basis of said first and second scanning locations; and
   means for establishing said first threshold by identifying modulation values known to be outside at least some of said regions of high contrast, and by setting the first threshold as a function of the modulation values so identified.

28. An interferometric device for measuring the thickness of a film, comprising:
   means for scanning the film at a predetermined plan location on the film to obtain a correlogram produced by interference of a reference beam with a test beam reflected at a first interface between the film and a first adjacent medium and at a second interface between the film and a second adjacent medium;
   means for calculating a modulation profile corresponding to said correlogram;
   means for identifying, as valid modulation values, modulation values from said profile that are above a first threshold;
   means for sorting the valid modulation values into a first modulation envelope corresponding to a first region of high contrast produced by the first interface and into a second modulation envelope corresponding to a second region of high contrast produced by the second interface;
   means for comparing said first and second modulation envelopes to a second threshold, wherein the second threshold is a function of a model modulation envelope;
   means for determining a first scanning location corresponding to a peak of the first modulation envelope and a second scanning location corresponding to a peak of the second modulation envelope; and
   means for calculating a film thickness at said plan location on the basis of said first and second scanning locations.

29. In an interferometric device for measuring the thickness of a film based on scanning locations corresponding to peaks of overlapping modulation envelopes produced by interference of a reference beam with a test beam reflected at a first interface between the film and a first adjacent medium and at a second interface between the film and a second adjacent medium, the improvement comprising the following:
   means for estimating a virtual envelope for at least one of said envelopes on the basis of an estimated shape in a region of overlap; and
   means for calculating a scanning location corresponding to a peak of the virtual envelope.

* * * * *